United States Patent [19]

Lan

[11] Patent Number: 5,477,589
[45] Date of Patent: Dec. 26, 1995

[54] PISTON-TYPE DOOR CLOSER WITH ADJUSTABLE CLOSING SPEEDS

[76] Inventor: Mei-Shu Lan, No. 1, Lane 63, Chien-Chih St., East District, Taichung, Taiwan

[21] Appl. No.: 289,971

[22] Filed: Aug. 12, 1994

[51] Int. Cl.[6] .................................. E05F 3/00; E05F 5/10
[52] U.S. Cl. .............................. 16/51; 16/DIG. 9; 16/84; 16/66
[58] Field of Search ................................... 16/51, 56, 84, 16/66, DIG. 9

[56] References Cited

U.S. PATENT DOCUMENTS

| | | | |
|---|---|---|---|
| 4,180,888 | 1/1980 | Nagase | 16/DIG. 9 |
| 4,230,309 | 10/1980 | Schnitzius | 16/66 |
| 4,817,238 | 4/1989 | Liu | 16/84 |
| 5,157,806 | 10/1992 | Wartian | 16/84 |

Primary Examiner—P. Austin Bradley
Assistant Examiner—Adesh Bhargava
Attorney, Agent, or Firm—W. Wayne Liauh

[57] ABSTRACT

A multi-stage door closer for automatically closing a door after the door is opened; it contains a cylinder having three sections each with a different diameter. The middle section has the largest diameter. A pair of speed adjusting mechanisms are provided which are sleeved about a piston rod placed inside the cylinder. Each of the speed adjusting mechanism contains a rotatable piston head, which will rotate with the cylinder, and a fixed piston head, which will not rotate with the cylinder. By cooperated actions among the variously-sized sections of the cylinder and the pair of speed adjusting mechanisms, each speed adjusting mechanism can be separately adjusted to control the door closing speed at various stages of the door closing action. For example, the door closer can be designed such that the first speed adjusting mechanism is made to control the door closing speed during the first 10°; whereas, the second speed adjusting mechanism is made to control the door closing speed after the first 10°. Other arrangements are possible and can be easily designed.

19 Claims, 15 Drawing Sheets

PISTON-TYPE DOOR CLOSER WITH ADJUSTABLE CLOSING SPEEDS

FIELD OF THE INVENTION

The present invention relates to a piston-type door closer with multiple stages of adjustable door closing speeds. More specifically, the present invention relates to a generally cylindrically-shaped piston-type door closer for automatically closing an opened door which is operable by means of pneumatic or hydraulic forces and whose door closing speeds can be conveniently adjusted. Furthermore, the present invention allows the door to be operated at multiple stages of door closing speeds, and the door closing speed at each stage can be conveniently and separately adjusted.

BACKGROUND OF THE INVENTION

Doors belong to those devices that are used by us on an everyday basis. To facilitate the automatic closing of opened doors, door closers have been provided which are affixed to the doors and door frames. There are a wide variety of door closers, most notably the sliding door closers provided in departmental stores and offices which open and close automatically. However, the sliding door closers are very expensive and thus are not suitable for ordinary homes, small offices, machine shops or manufacturing plants. Spring-type door closers are much less expensive; however, they close too quickly and often cause violent collisions between doors and door frames, thus resulting in damages to the doors. There are also other spring-type door closers available in the market which are connected with a pneumatic or hydraulic shock absorber to provide a smoother door closing action. However, since the resistance provided by the pneumatic or hydraulic shock absorber is constant and the spring force is proportional to the extent to which the door is opened, the door closing speed is still too violent during the first four-fifth of the closing period, resulting an unstable door closing action and undesirable inconvenience.

Some door closers are provided with adjustable door closing speeds. For example, FIG. 1 is a perspective view of a conventional door closer with such adjustable door closing speeds. The cylinder 1 is exposed to the atmosphere and a square shoulder 3 is provided which can be turned by a wrench 2 to adjust the closing speed of the door closer. One of the shortcomings associated with the conventional adjustable door closers is that the square shoulder 3 only allows a very limited room for speed adjustment. Furthermore, because the cylinder 1 is exposed to the atmosphere, it often collects dust and adversely affects the long term durability of the door closer.

FIG. 2 shows a perspective view of another conventional door closer with adjustable door closing speeds; it is similar to the door closer shown in FIG. 1, but is provided with a plastic cover 5 formed from an extrusion process to protect the cylinder I from exposure to the atmosphere. A U-shaped square shoulder cover 5a is also provided which can be easily opened to allow a wrench 6 to work on the square shoulder 3. This type of door closer minimizes the dusting problem experienced in the first type; however, many of the shortcomings still exist. For example, it is still cumbersome to work on the speed-adjusting square shoulder 3. Furthermore, the plastic material, from which the cylinder cover 5 is made, can be fire-hazardous. The cylinder cover 5 often is distorted and/or cracked due to aging or other abuse, thus losing its intended protective purpose.

SUMMARY OF THE INVENTION

The primary object of the present invention, which was the fruit of many years of dedicated research effort by the inventor, is to provide a piston-type door closer for smoothly closing opened doors. More specifically, the primary object of the present invention is to develop an automatic door closer with multiple stages of door closing speeds and the door closing speed during each stage can be separately and conveniently adjusted. With the door closer disclosed in the present invention, the door closing speeds can be conveniently adjusted and the entire device, including the piston containing cylinder and the speed adjusting member, is safely enclosed in a fire-retardant housing body to prevent dusting and prolong the useful life of the door closing device.

The door closer of the present invention comprises a longitudinally extending housing body for receiving a piston contained in a cylinder. The front and rear ends of the cylinder are provided with a connecting rod and a speed-adjusting screw, respectively. The housing body has an open longitudinal side face, which can be closed to shield the cylinder from the outside atmosphere by a cover. The cylinder contains a piston rod, which penetrates through one end (front end) of the cylinder and is connected to a connecting rod at the other end (rear end) thereof. A cylinder cap is provided at the rear end of the cylinder which is affixed to the cylinder and is connected to a speed-adjusting screw. The piston rod is provided with a pair of speed-adjusting mechanisms each comprising a rotatable piston head and a fixed piston head, both of the rotatable piston head and the fixed piston head are sleeved about the piston rod, or an extension thereof. The rotatable piston head contains an axial passage and a radially extending inclined groove in communication with the axial passage.

The fixed piston head has a spiral seat on its front face to receive a similarly shaped spiral washer. However, the spiral washer has a thickness greater than the depth of the spiral seat so as to allow a spirally shaped protrusion to be axially extended from the front surface of the fixed piston head. The rotatable piston is sealingly connected with the inner walls of the cylinder via an O-ring. By turning the speed-adjusting screw, the cylinder and the rotatable piston head will also turn, as a result of the frinction caused by the O-ring. This causes the relative position between the fixed piston head and the rotatable head to change. As a consequence, the inclined groove will be covered by different portion of the spiral washer, resulting in a change in the groove opening that will allow a fluid to flow therethrough. Such a spiral washer-inclined groove combination allows the flow rate of the fluid contained in the cylinder through the inclined groove to be adjusted, thus adjusting the door closing rate.

In the first preferred embodiment of the door closer disclosed in the present invention, the cylinder contains three sections each with a different diameter. The middle section has the largest diameter. By cooperated actions among the variously-sized sections of the cylinder and the pair of speed adjusting mechanisms described above, each speed adjusting mechanism can be separately adjusted to control the door closing speed at various stages of the door closing action. For example, the door closer can be designed such that the first speed adjusting mechanism is made to control the door closing speed during the first 10°; whereas, the second speed adjusting mechanism is made to control the door closing speed after the first 10°. Other arrangements are possible and can be easily designed.

BRIEF DESCRIPTION OF THE DRAWING

The present invention will be described in detail with reference to the drawings showing the preferred embodiment of the present invention, wherein.

DETAILED DESCRIPTION OF THE PREFERRED EMBODIMENT

The present invention will now be described more specifically with reference to the following examples. It is to be noted that the following descriptions of example including preferred embodiment of this invention are presented herein for purpose of illustration and description; it is not intended to be exhaustive or to limit the invention to the precise form disclosed.

Figure 1:
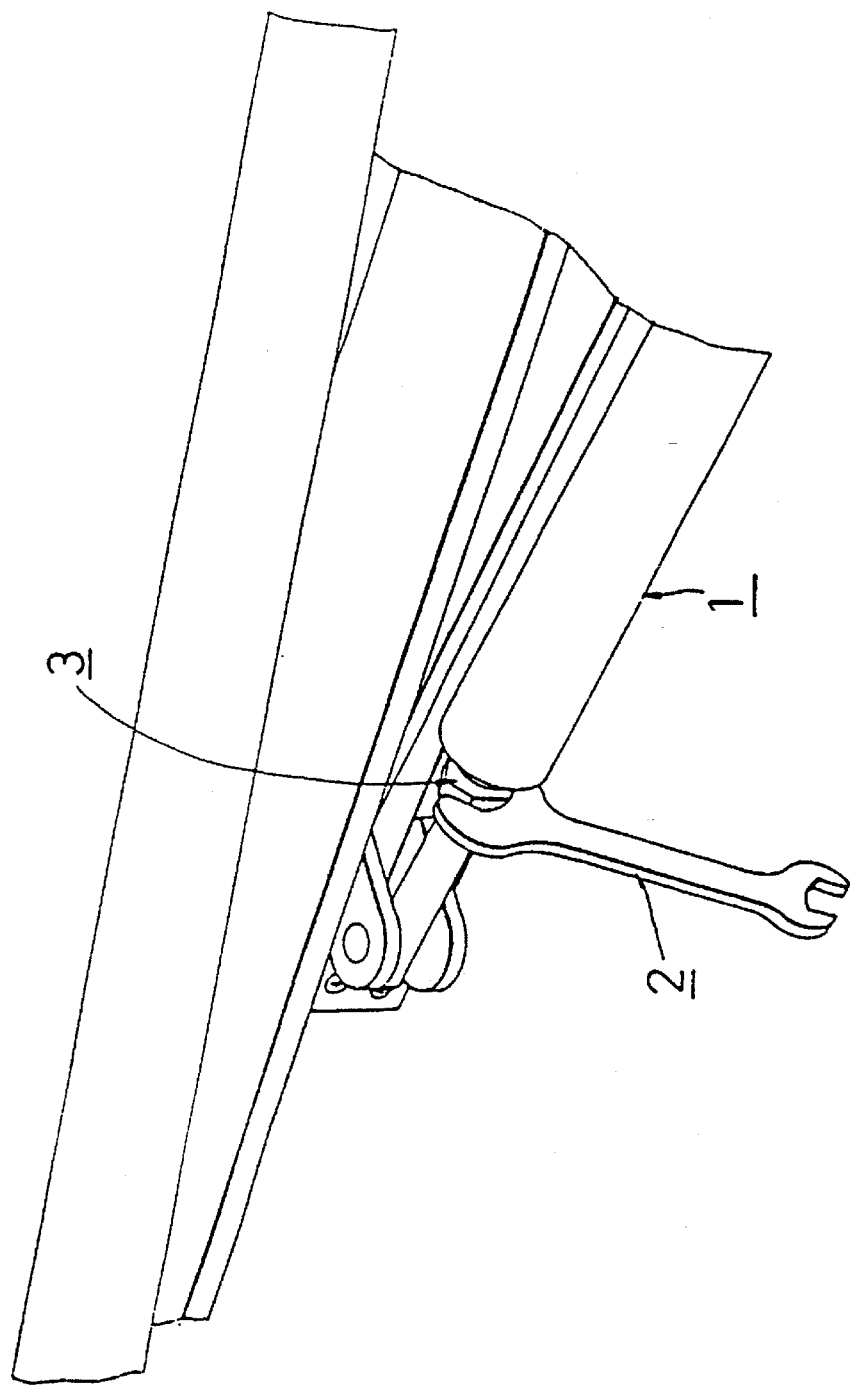
FIG. 1 is a perspective view of a conventional door closer with adjustable speeds.
Figure 2:
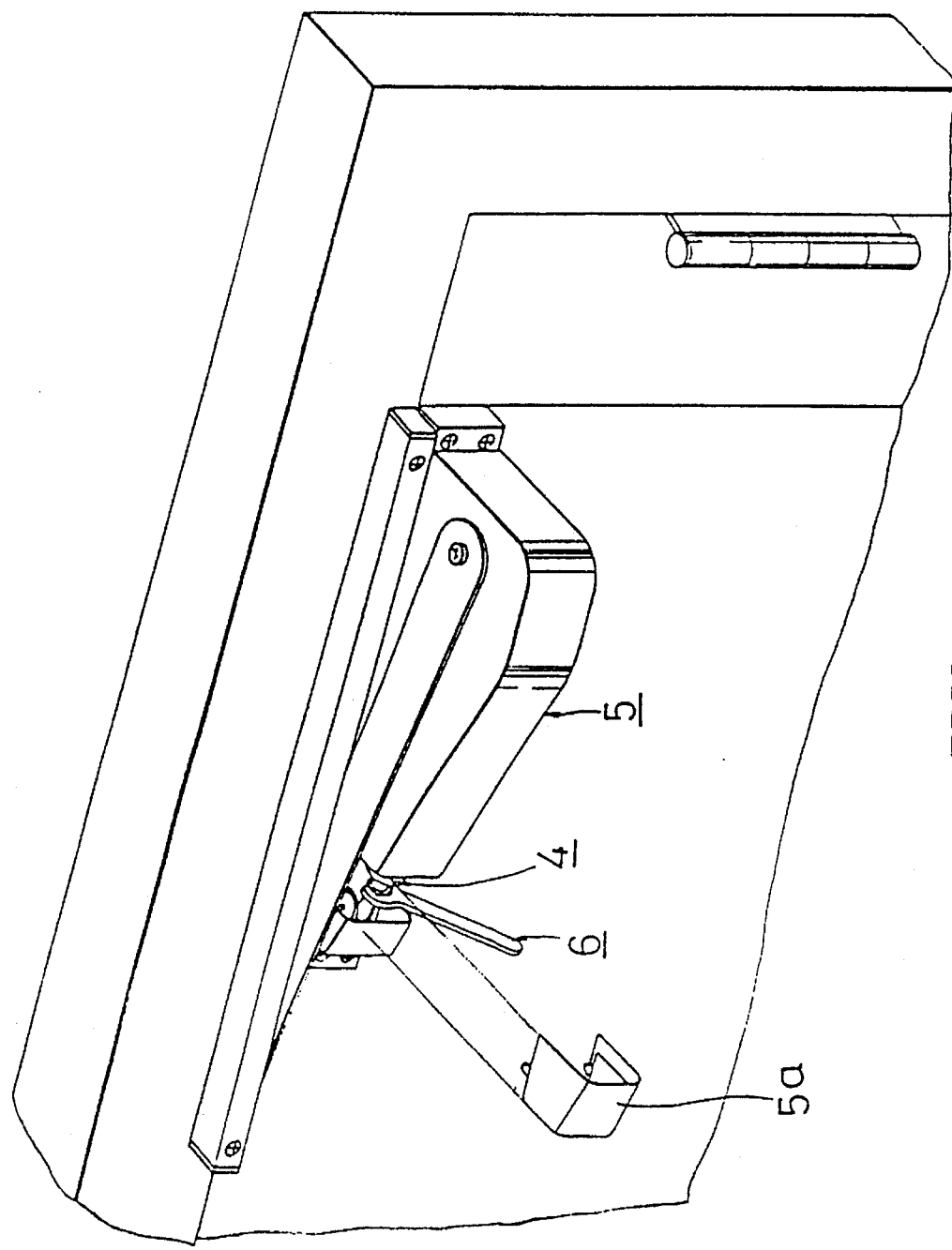
FIG. 2 is a perspective view of another conventional door closer with adjustable speeds.
Figure 3:
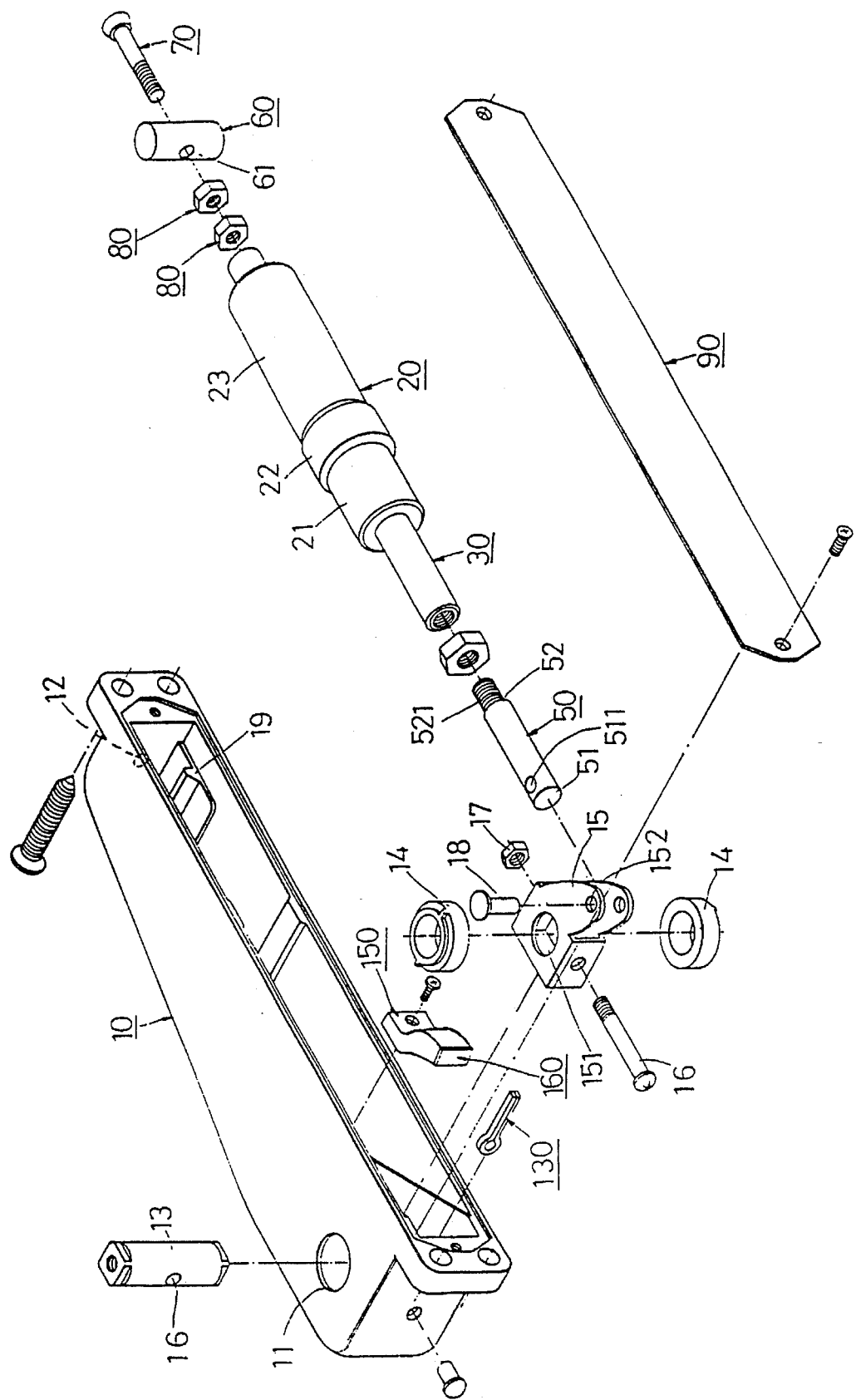
FIG. 3 is an exploded view of a first preferred embodiment of the door closer with adjustable speeds of the present invention.
Figure 4:
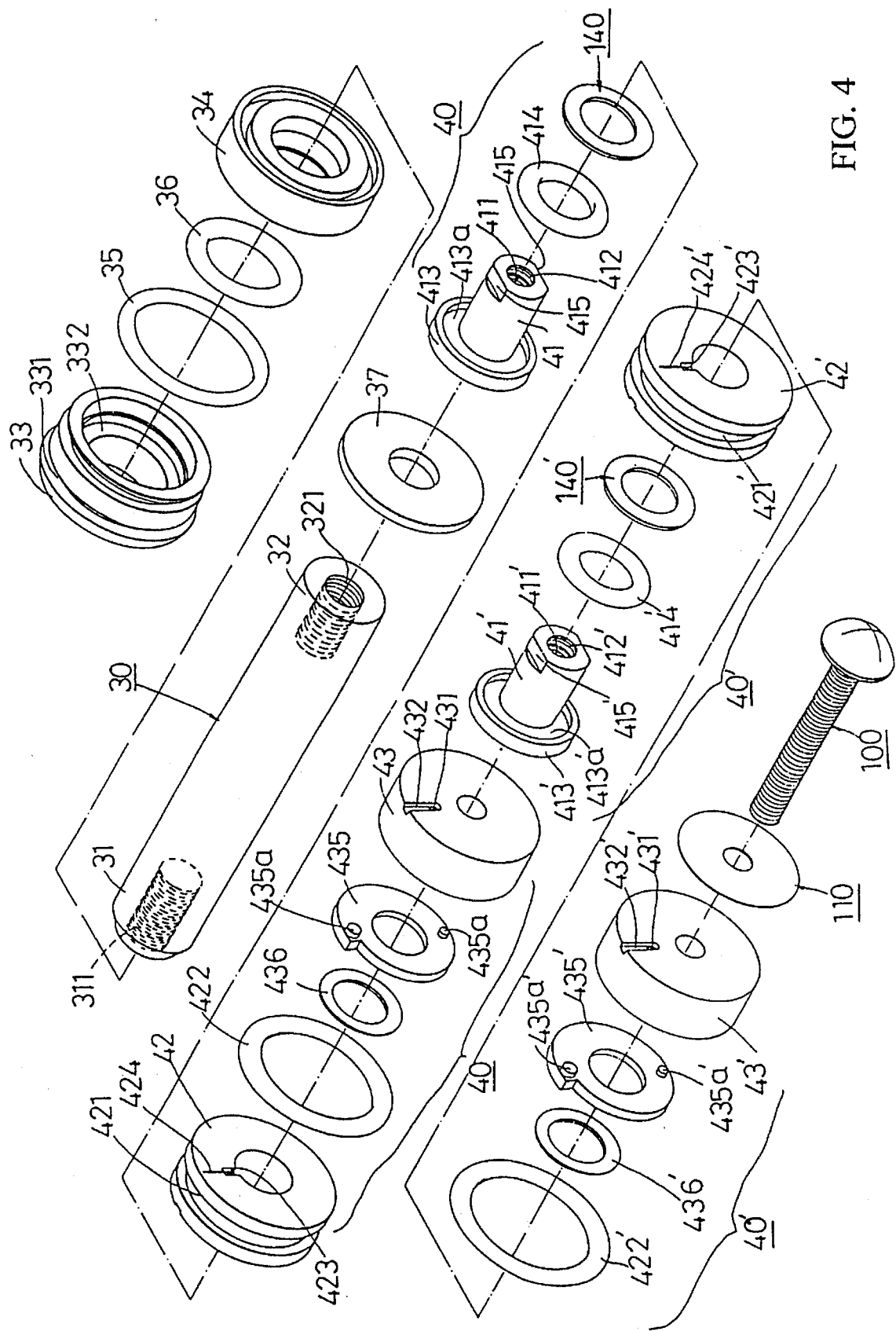
FIG. 4 is an exploded view of the speed-adjusting mechanisms according to the first preferred embodiment of the present invention.

Now referring to the drawings. FIG. 3 is an exploded view of a first preferred embodiment of the door closer with adjustable door closing speeds disclosed in the present invention. And FIG. 4 is an exploded view of the speed-adjusting mechanisms according to the first preferred embodiment of the present invention. The door closer contains a housing body 10, a cylinder 20, a piston rod 30 and a pair of speed-adjusting mechanisms 40, 40'.

The housing body 10, which is to be affixed to the door or door frame, preferably near the top edge thereof, is a generally rectangularly shaped hollow body having an open bottom face. The open bottom face can be closed by a bottom cover 90 to prevent dust of other foreign material from entering the interior space of the cylinder 20. Shaft holes 11 are provided at both sides of the front end (the front and rear end are designated as a convenience; their designation can be reversed and do not represent any particular significance as far as the operation of the door closer is concerned) of the housing body 10. A speed adjusting hole 12 is provided at the rear end of the housing body 10. A shaft 13 is placed through the shaft holes 11. Two shaft bushings 14 are sleeved about the shaft 13 at the two respective ends thereof but between and on the two shaft holes 11. The shaft 13 is to be affixed with a link 15, which has a U-shaped cross-section with a pair of positioning holes 151 at its top and base portions, respectively, to allow the shaft 13 to insert therethrough. The link 15 contains a pair of pin holes 152 at two extensions, respectively, thereof. A bolt 16 is inserted through the front face of the link 15. The bolt 16 also radially goes through the shaft 13. The bolt 16 affixes the link 15 with the shaft 13 via nut 17.

The connecting rod 50 is a short cylindrically shaped rod. A pin hole 511 is provided radially through the front portion 51 of the connecting rod 50 to allow a pin 18 to insert therethrough. The pin 18 affixes the connecting rod with the link 15 via the pin holes 152 provided at the extensions of the link 15. The rear end 52 of the connecting rod 50 is provided with male threaded portion 521. A pair of locating blocks 19 are provided respectively at the two opposing inner faces of the housing body near the speed adjusting hole 12. The space defined between the locating blocks 19 and rear end of the cylinder which contains the speed adjusting hole 12 allows the supporting stud 60 to be received therein. A speed-adjusting screw 70 is inserted from the exterior of the housing body 10 through the speed adjusting hole 12 and the circular hole 61, in cooperation of nuts 80, to affix supporting stud 60.

Figure 5:
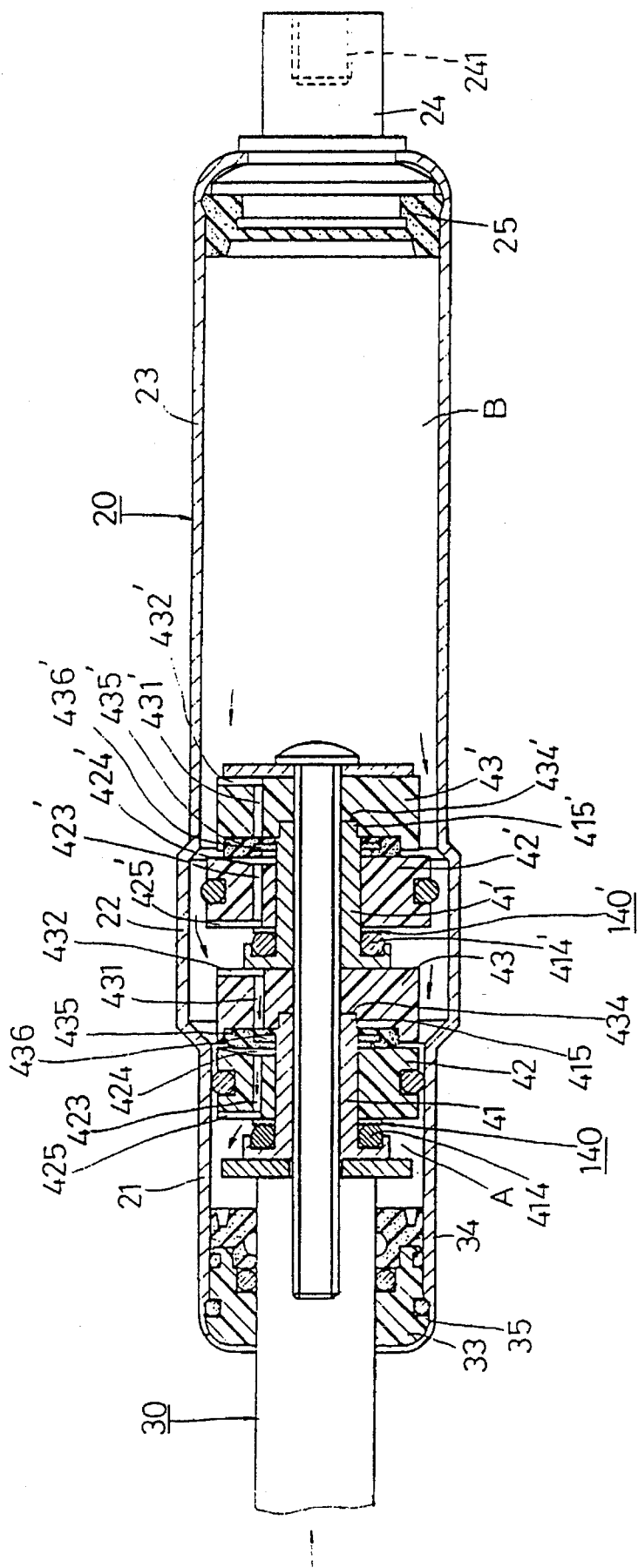
FIG. 5 is a longitudinal cross-sectional view of the piston-cylinder portion according to the first preferred embodiment of the present invention when the door was opened for a small angle (e.g. less than 10°).

The cylinder 20, which is placed inside the housing body 10, is preferably a cylinder with an opening at both ends thereof The cylinder 20 comprises three sections of varying diameters as shown in FIG. 5. The front section 21, which is closest to the shaft hole 11 of the housing body 10, has the smallest diameter. The middle section 22 has the largest diameter, and the rear section 23 has an intermediate diameter. The rear section 23 is sealed by a cylinder cap 24 in conjunction with a rubber seal 25. The rubber seal 25 is so dimensioned such that it matches closely with the inner walls of the rear section 23 of the cylinder 20. A threaded hole 241 is provided in the rear end of the cylinder cap 24 to allow the speed adjusting screw 70 to insert therethrough.

The piston rod 30 is a cylindrically shaped rod, the front portion 31 thereof pierces through the front end of the front section 21 of the cylinder 20, as shown in FIG. 4. A female threaded hole 311 is provided at its front portion for a threadable connection with the male threaded portion 521 of the connecting rod 50. The rear end 32 of the piston rod 30 is provided with another threaded hole 321. The piston rod 30 is sleeved with a piston rod guide 33 on the outer periphery thereof. A seal 34 is wedged into the piston rod guide 33. A ring-shaped groove is provided on the outer periphery of the piston rod guide 33 to receive an O-ring 35. The inner portion of the piston rod guide 33 contains an annular seat 332 to receive an O-ring 36, which provides a movable but tightly sealed relationship between the piston rod 30 and the front section 21 of the cylinder 20. A washer 37 is provided about the piston rod 30 to limit the length by which the piston rod penetrates outside the cylinder 20.

FIG. 4 is an exploded view of the pair of speed-adjusting mechanisms 40 and 40' of the door closer according to the first preferred embodiment of the present invention. They comprise first positioning rod 41, second positioning rod 41', first rotatable piston head 42, second rotatable piston head 42', first fixed piston head 43, and second fixed piston head 43'. The first and second fixed positioning rods 41 and 41' have the same structure. Therefore, discussions of the first positioning rod 41 are applicable to the second positioning rod 41'. The first positioning rod 41 is a short cylindrical rod with a circular flange 413 attached to its front end. A perforation 411 is formed at the center thereof. Female threads 412 are provided in the perforation 411.

The rear surface of the circular flange 413 is provided with a ring-shaped groove 413a to received an O-ring 414. The front end of the first positioning rod 41 threadably connects with the threaded portion 321 of the piston rod 30 via a piston screw 100 with a washer 37 disposed therebetween. The rear end portion of the first positioning rod 41 contains two locating notches 415. The piston screw 100, which is axially inserted through the rear end of the second positioning rod 41', with a washer 110 therebetween, affixes the second positioning rod 41' and the first positioning rod 41 to the rear end portion 32 of the piston rod 30.

Figure 7:
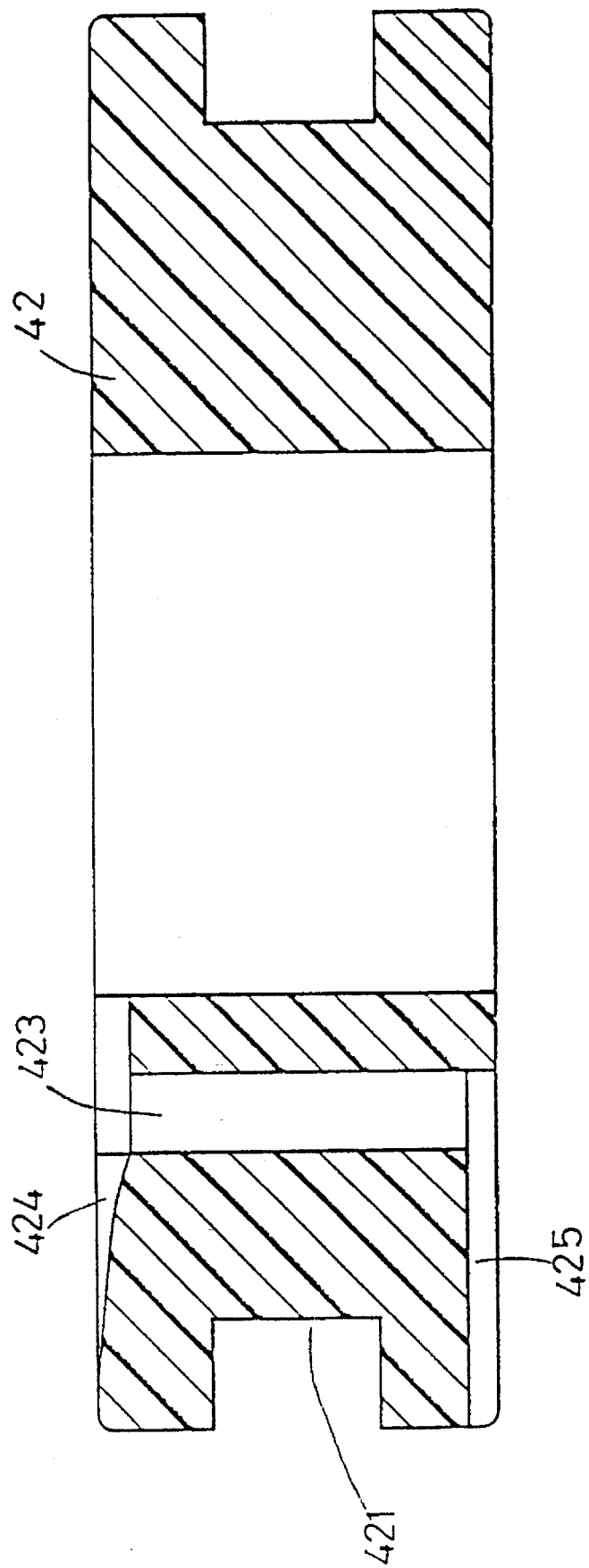
FIG. 7 is an enlarged longitudinal cross-sectional view of the rotatable piston according to the first preferred embodiment of the present invention.

The first and second rotatable piston heads 42, 42' are sleeved about the first and second positioning rods 41 and 41', respectively. As shown in FIG. 4, they have similar structures; therefore, discussions of the first rotatable piston head 42 are equally applicable to the second rotatable piston head 42'. The first rotatable piston head 42 is a generally disk-shaped member. An annular groove 421 is provided on the outer periphery of the first rotatable piston head 42. The inner space of the annular groove 421 is provided with an O-ring 422. As shown in FIG. 7, which is an enlarged longitudinal cross-sectional view of the rotatable piston according to the first preferred embodiment of the present invention, an axial passage 423 is provided in the first rotatable piston head 42. An inclined groove 424 is also provided in the rear end of the first rotatable piston head 42 which is in communication with the axial passage 423.

The front end of the first rotatable piston head 42 has a radially extending perforation 425 which is also in communication with axial passage 423. The first rotatable piston head 42 is smaller in construction than the second rotatable piston head 42'. As shown in FIG. 5, O-ring 422 provided on the outer periphery of the first rotatable piston head 42 provides a tight but movable seal between the first rotatable piston head 42 and the front section 21 of the cylinder 20; whereas, O-ring 422' of the second rotatable piston head 42' provides a tight but movable seal between the second rotatable piston head 42' and the rear section 23 of tile cylinder 20.

Figure 8:
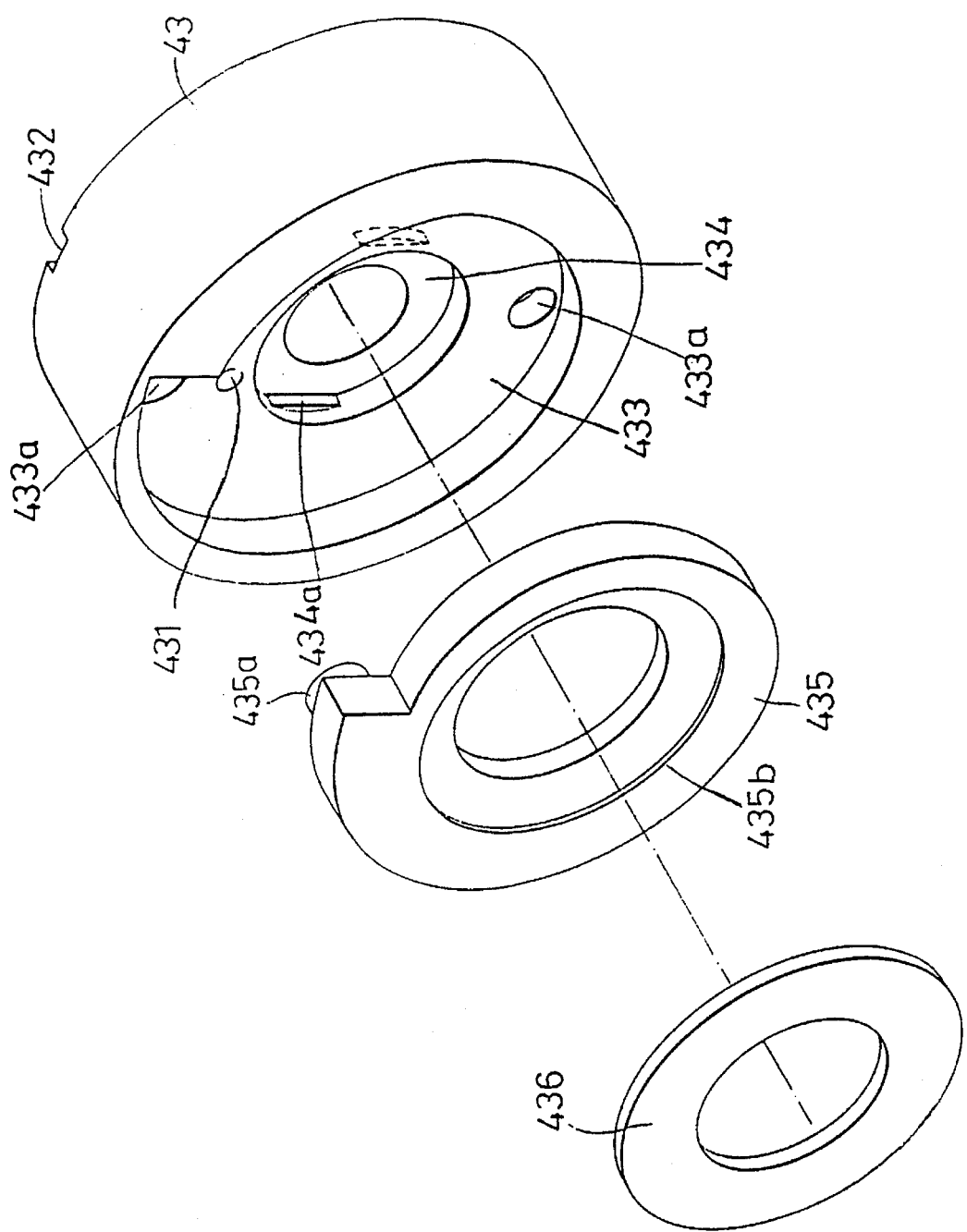
FIG. 8 is an exploded view of the fixed piston and the spiral washer according to the first preferred embodiment of the present invention.

The first and second fixed piston heads 43 and 43' are also sleeved about the piston screw 100, and are placed behind (i.e., closer to the rear end of the housing body 10) the first and second rotatable piston heads 42 and 42', respectively. Both have similar structures, thus it will be adequate only to describe the detailed structure of the first fixed piston head 42. FIG. 8 is an exploded view of the first fixed piston head 43 according to the first preferred embodiment of the present invention. The same description can be applied to the second fixed piston head 43'. The first fixed piston head 43 is a cylindrical member with a axial passage 431 axially penetrating therethrough. The rear face of the first fixed piston head 43 is provided with a radially extending perforation 432 which is in communication with the axial passage 431. The front face of the first fixed piston head 43 contains a spirally shaped recess 433 for receiving a spirally shaped washer 435, which matches the dimension of the spiral recess 433 but has a slightly greater thickness than the depth of the spirally shaped recess 433.

The center portion of the spiral recess 433 contains a circularly shaped deeper recess 434. Two protrusions are provided on the side periphery of the recess 434 which respectively match the positions and dimensions of the aforementioned notches 415. A plurality of insertion holes 433a are provided on the spirally shaped recess 433 to receive matching protrusions 435a provided on the spiral washer 435 so as to prevent the orbital motion of the spiral washer 435 relative to the spiral recess 433. However, the central portion of the spiral washer 435 is movable axially relative to the spiral recess 433. The front face of the spiral washer 435 contains a circular groove 435b, which is provided to receive a protective washer 436. The protective washer 436 is preferably made of a metal material to provide strength support for the spiral washer 435 as well as to serve as a shield to avoid the diffusion of fluid therethrough.

FIG. 5 is a longitudinal cross-sectional view of the piston-cylinder portion according to the first preferred embodiment of the present invention after it is assembled and when the door was opened for a small angle, which, in the present case, is less than 10°. When the door was closed, the first rotatable piston head 42 and the first fixed piston head 43 are positioned in the front section 21 of the cylinder 20. At this time, the sealed relationship between the O-ring of the first rotatable piston head 43 and the inner wall of the cylinder 20 forms a first chamber A between the first rotatable piston head 43 and the ting-shaped seal 34, and a second chamber B between the first rotatable piston head 43 and the rubber seal 25. When the door is opened, the door (not shown) is pushed which exerts a pushing force on the connecting rod 50 (as shown in FIG. 3 ). This causes piston rod 30, as well as all the components attached thereto, to move toward the rubber seal 25 and compresses fluid contained in chamber B.

Figure 6:
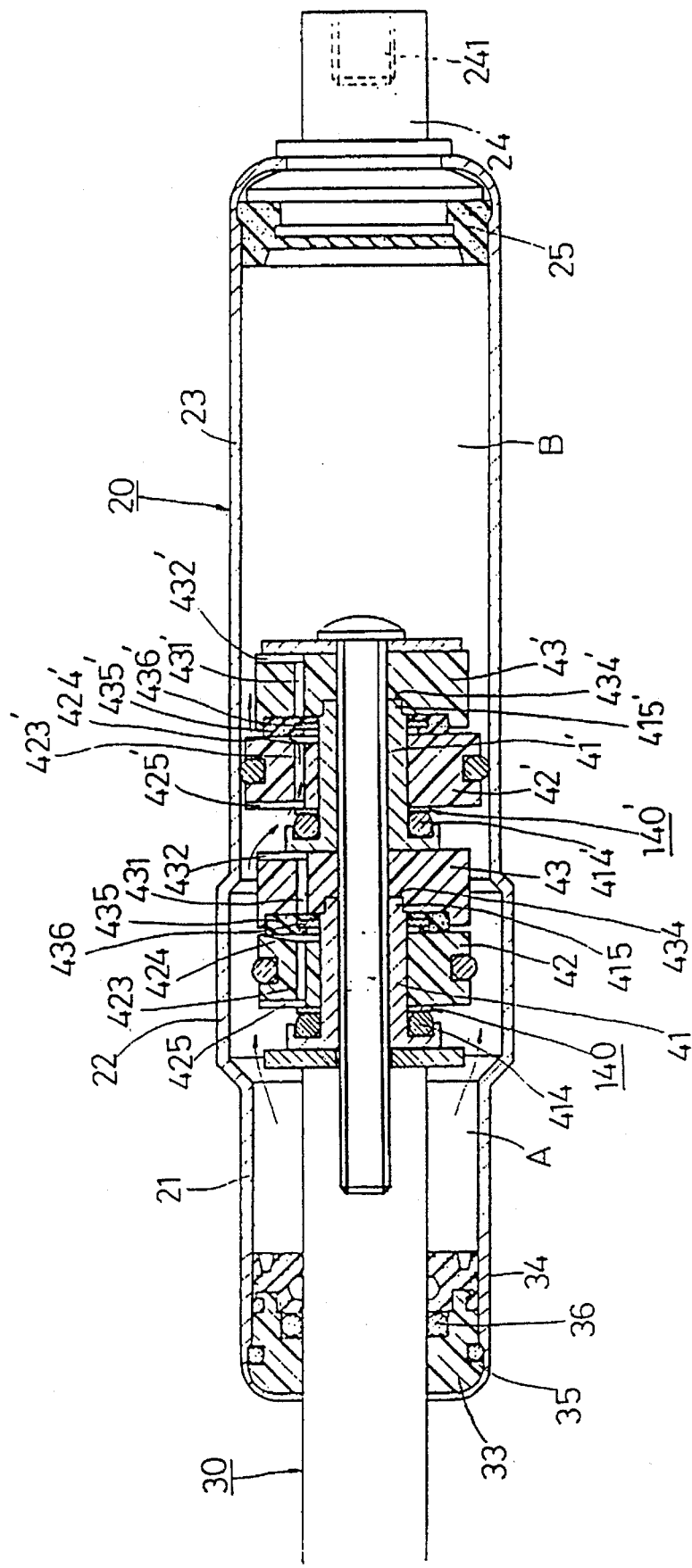
FIG. 6 is a longitudinal cross-sectional view of the piston-cylinder portion according to the first preferred embodiment of the present invention when the door was opened for a larger angle (e.g. greater than 10°).

As a result, the fluid contained in chamber B flows through the perforation 432 of the first fixed piston head 43 into axial passage 431, and applies a pressure onto the protective washer 436. The axial passage 431 is a closable passage. Because the protective washer 436 is not fixedly attached to the rotatable piston head 42, the central portion of the spirally shaped washer 435 will be slightly pushed away and separated from the spiral recess 433. This separation allows fluid to flow from the second chamber B through axial passage 431 and axial passage 423 then into first chamber A. In the preferred embodiment as shown in FIG. 5, when the door is opened for more than 10°, the first rotatable piston head 42 will enter the middle section 22 of the cylinder 20 and will not any more interact with the inner wall of the cylinder 20. At this time, the second rotatable piston head 42' will have entered the rear section 23 of the cylinder 20 and continue to cause the fluid in the second chamber B to be compressed. Because the fluids in chambers A and B are maintained at equal pressure, a smooth door closing speed is maintained throughout the entire door closing action. FIG. 6 is a longitudinal cross-sectional view of the piston-cylinder portion according to the first preferred embodiment of the present invention when the door was opened for a larger angle.

Also as shown in FIG. 6, when the door is released, because the front end of the piston rod 30 is exposed to the atmosphere while all other portions are subject to an enhanced pressure in both chamber B and chamber A, a force difference is developed which is acting on the piston rod 30 even though chamber A and Chamber B are under the same pressure. Such a force caused by the difference between the compressed pressure and the atmospheric pressure pushes the piston rod 30 forward toward the front end of the cylinder 20. This in turn causes the fluid in chamber A to flow through axial passage 423' of the front surface of the second rotatable piston head 42' and out from it rear surface. At this time, the fluid from chamber A will flow through the tapered groove 424', which is in communication with axial passage 423', and out from the interstices provided between the spiral washer 435' and the inner wall of the cylinder 20. The tapered groove 424' has a generally rectangular cross-section, and its depth, thus opening, decreases with increasing radius. After the door closes to within 10°, the compressed fluid flows through the first rotatable piston head 42 and the fixed piston head 43 at the same direction and substantially the same or a different flow rate. This completes the door closing action.

Figure 9:
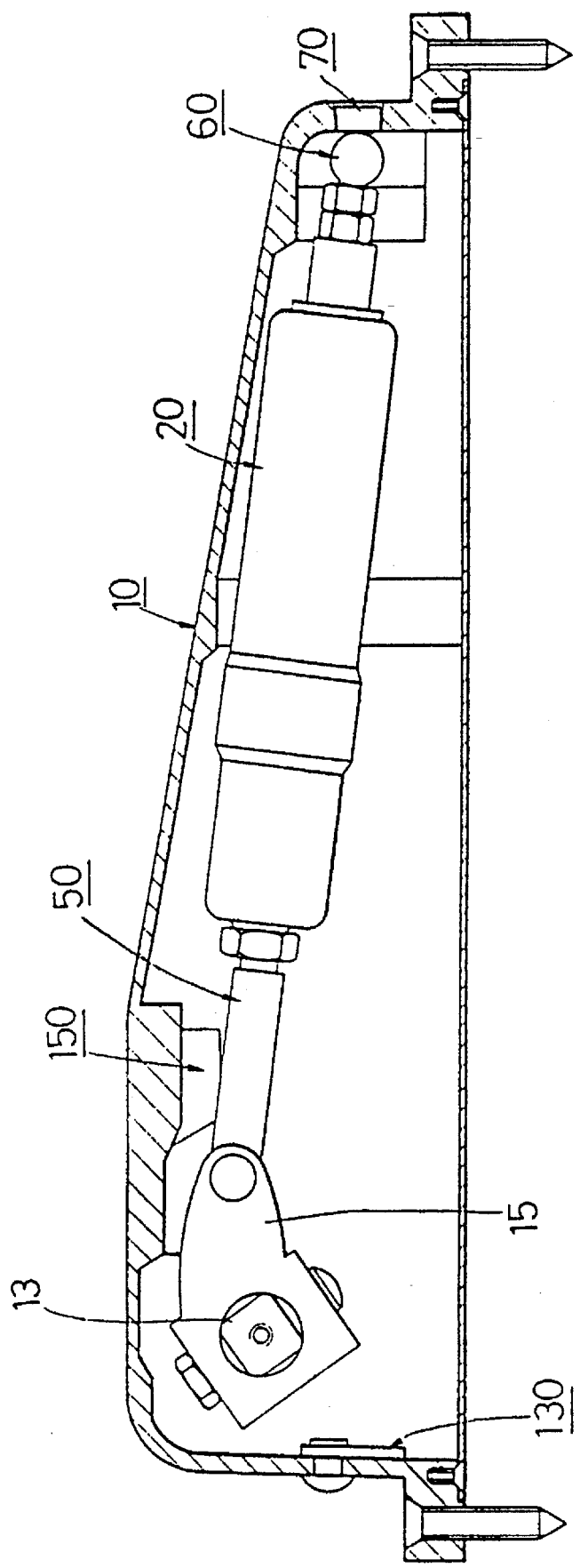
FIG. 9 is a schematic view showing the operation of the door closer according to the first preferred embodiment of the present invention.

The adjustment of the door closing speed is illustrated in FIG. 9, which is a schematic view showing the operation of the door closer according to the first preferred embodiment of the present invention. During the first stage of the speed adjustment, i.e., when the door is opened within 10°, a screw driver (not shown) can be used to turn the speed adjusting screw 70. This in turn causes the cylinder 20 to turn. Due to the tight friction between the inner wall of the cylinder 20 and the first rotatable piston head 42, this also causes the first rotatable piston head 42 to rotate relative to the fixed piston head 43.

Figure 10:
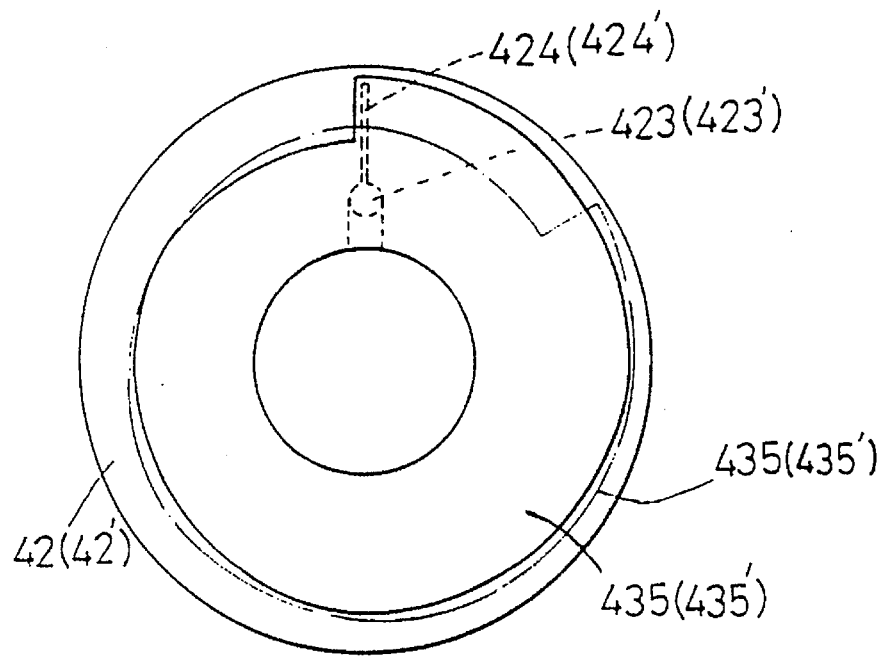
FIG. 10 is a schematic view showing the operation of the spiral washer of the door closer according to the first preferred embodiment of the present invention.

Now as shown in FIG. 10, which is a schematic view showing the operation of the spiral washer 435 of the door closer according to the first preferred embodiment of the present invention, a supporting stud 60 provides the fulcrum for the speed adjusting screw 70 to rotate. Because the spiral washer has a spirally shaped axial protrusions whose radii vary with their radial disposition (but with the same thickness), this changes the opening of the tapered groove 424 provided in the first rotatable piston head 42 as a result of the orbital movement of the spiral washer 435. This then results in a change in the flow rate of the compressed fluid through the tapered groove 424, and, consequently, the door closing speed. The above operation occurs when the angle between the door and the door frame is less than 10°, as shown FIG. 5. At this time, the second rotatable piston head 42' is idly located in the middle section 22 of the cylinder 20, and there is no contact between the O-ring 422' affixed to the second rotatable head 42 and the inner wall of the middle section 22 of the cylinder 20. Therefore, the relative position between the tapered groove 424' and the spiral washer 435' is not affected.

Figure 11:
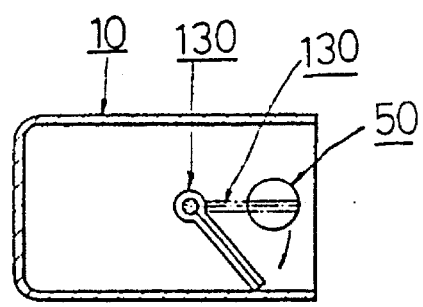
FIG. 11 is a schematic view showing the operation of the stopper of the door closer according to the first preferred embodiment of the present invention.
Figure 12:
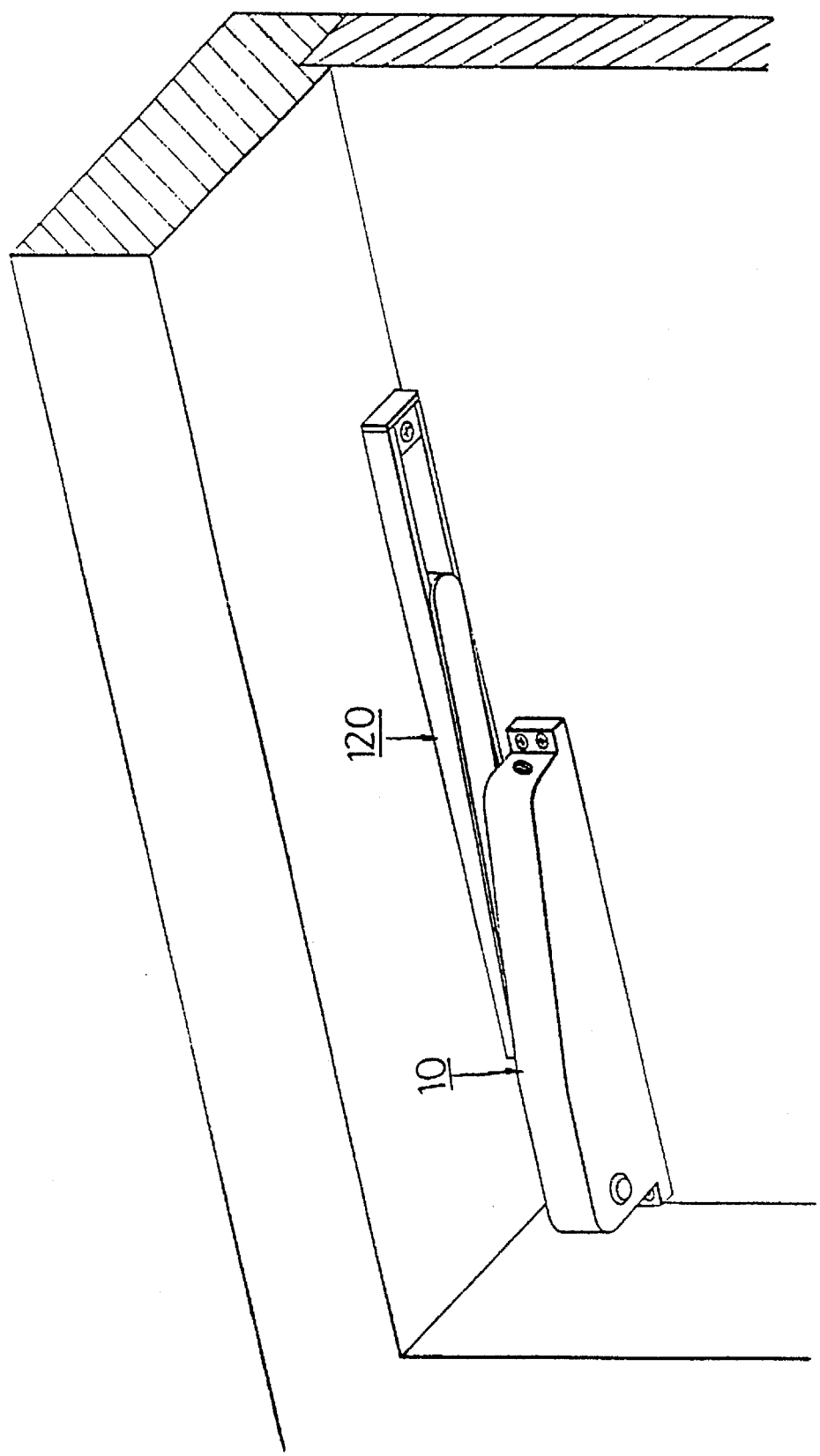
FIG. 12 is a schematic view showing an operation of the door closer according to the first preferred embodiment of the present invention after it is affixed to the door.
Figure 13:
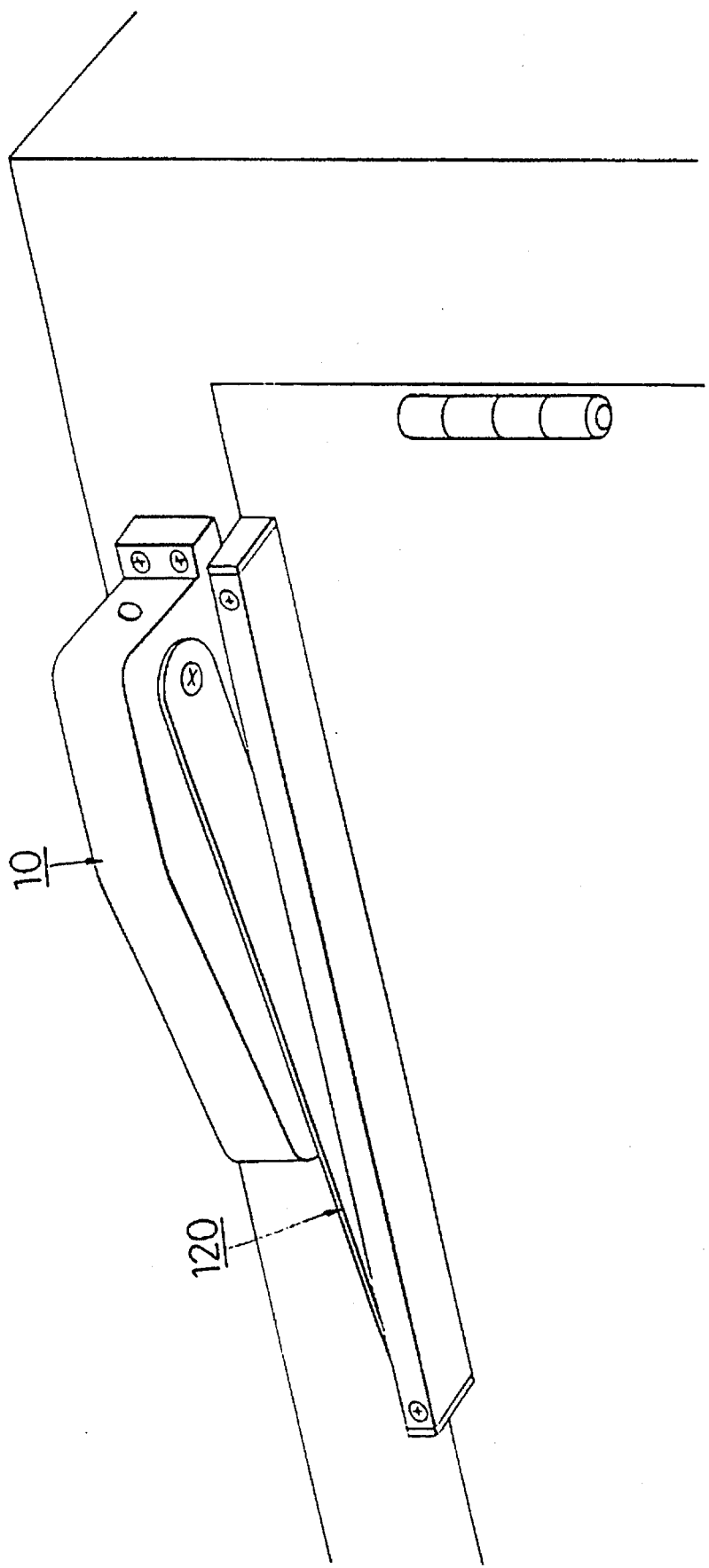
FIG. 13 is a schematic view showing the operation of the door closer according to the first preferred embodiment of the present invention after it is affixed to the door frame.

FIG. 12 is a schematic view showing an operation of the door closer according to the first preferred embodiment of the present invention after it is affixed to the door. And FIG. 13 is a schematic view showing the operation of the door closer according to the first preferred embodiment of the present invention after it is affixed to the door frame. The door closer of the present invention can be affixed to the inside or outside of the door frame (or the door body) via a sliding guide 120. As shown in FIGS. 3 and 9, the front end of the housing body 10 is provided with a key-shaped stopper 130, which is pivotably affixed to the front face of the housing body by a stud. During the shipment or transfer of the door closer, the stopper 130 is placed pointing toward the open side of the housing body 10. This ensures that the the bottom side of the housing body 10 is at the same level as the sliding guide 120, and thus allows the installation of the door closer to be made with minimum effort. After the door closer is installed, when the door is opened for the very first time, the retaining force, which pushes the stopper 130 to keep it in place, is removed. As a result, the tail end of the stopper 130 will swing downward (i.e., into the page as shown in FIG. 9). FIG. 11 further shows how stopper 130 swings downward after the door is opened for the very first time. After the door is first opened, the stopper 130 becomes dormant and no longer serves any function. However, when the door closer of the present invention is removed and installed in a different location, the stopper 130 can be manually pivoted upward so that it can be pushed by the connecting rod 50 to maintain a same level between the bottom side of the housing body (i.e., the bottom plate 90) and the sliding guide 120. This feature of the present invention saves the effort that will be required to install the door closer, but allows the link 15 and the connection rod 50 to be fully retreated toward the front face of the housing body 10, once the door is opened for the first time after installation, thus ensuring that the door can be fully closed.

Continuing referring to FIGS. 4, 5 and 8, the top peripheral portions of the positioning rods 41 and 41' have notches 415 and 415', respectively. The centers of the spiral recesses 433,433' of the first and second fixed piston heads 43, 43', respectively, are provided with recessed seats 434 and 434' with protrusions 434a and 434a' corresponding to the notches 415 and 415', to avoid relative motions of the first and second positioning rods 41, 41' with respect to the first and second fixed piston heads 43, 43'. Also as discussed earlier, metal protective washers 436 and 436' are respectively provided inside the spiral washers 435 and 435', which are preferably made of a resilient material such as rubber, to reduce the consumption of the spiral washers and prevent diffusion of fluid molecules.

Now referring to FIGS. 3 and 9, a rebound 150 is placed on the side of the housing body opposite the open face such that it will be urged by the link 15, when the door is fully open. The rebound 150 has a resilient bent portion, after the door is opened to a fully open or nearly fully open position, it will rebound and push the link 15 so as to allow the door to be closed. A metal plate 160 is placed on the rebound 150 at its point of contact with the link 15, so as to lengthen the life of the rebound 150.

Figure 14:
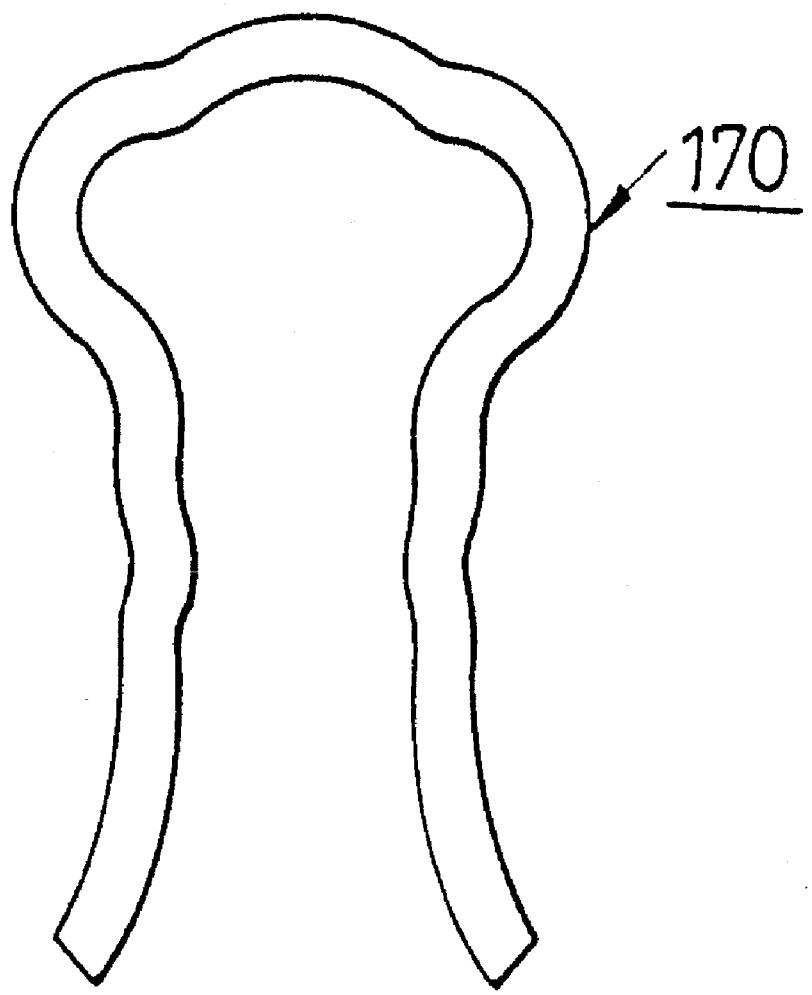
FIG. 14 is a perspective view of the open-mouth plate spring of the door closer according to the first preferred embodiment of the present invention.
Figure 15:
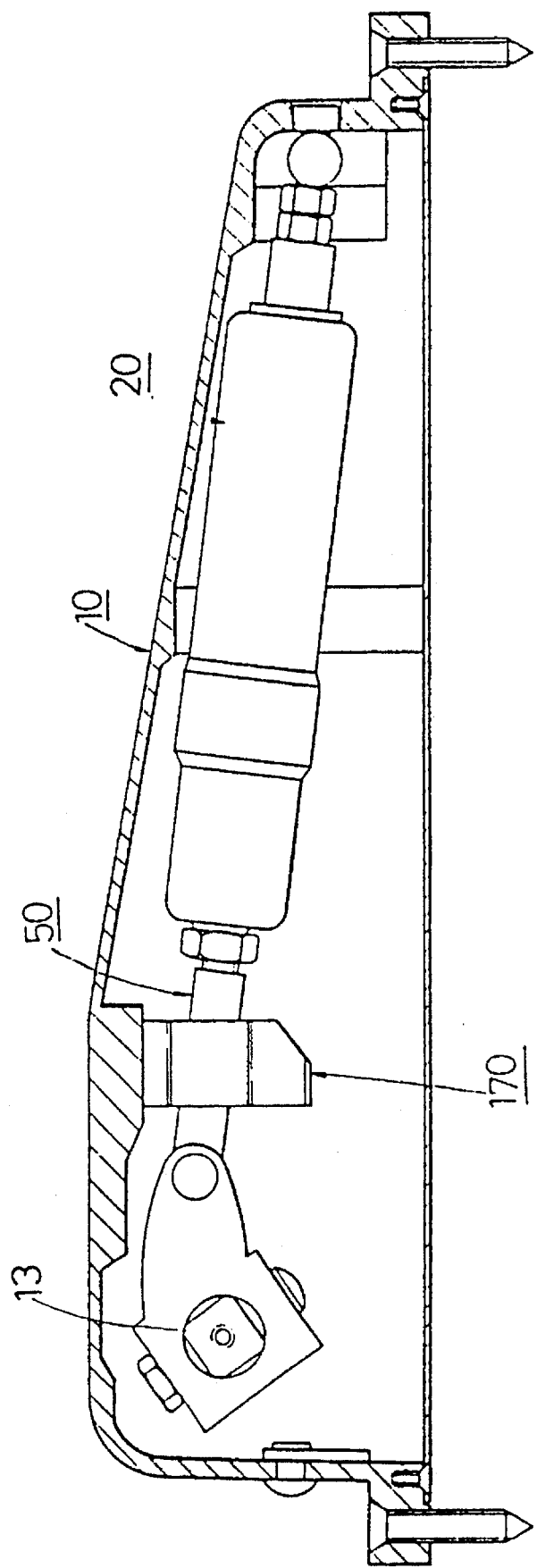
FIG. 15 is a schematic view showing another operation of the door closer according to the first preferred embodiment of the present invention.

FIG. 14 is a perspective view of a plate spring 170 for use with the door closer according to the first preferred embodiment of the present invention. The plate spring 170 is placed at the front end of the housing body 10 near the insert hole 11 thereof. As shown in FIG. 15, which is a schematic view showing another operation of the door closer according to the first preferred embodiment of the present invention, after the door is opened to a fixed position, the connecting rod 50 will wedge into the plate spring 170 through the opening thereof, to thereby fix the door at the opened position.

Figure 16:
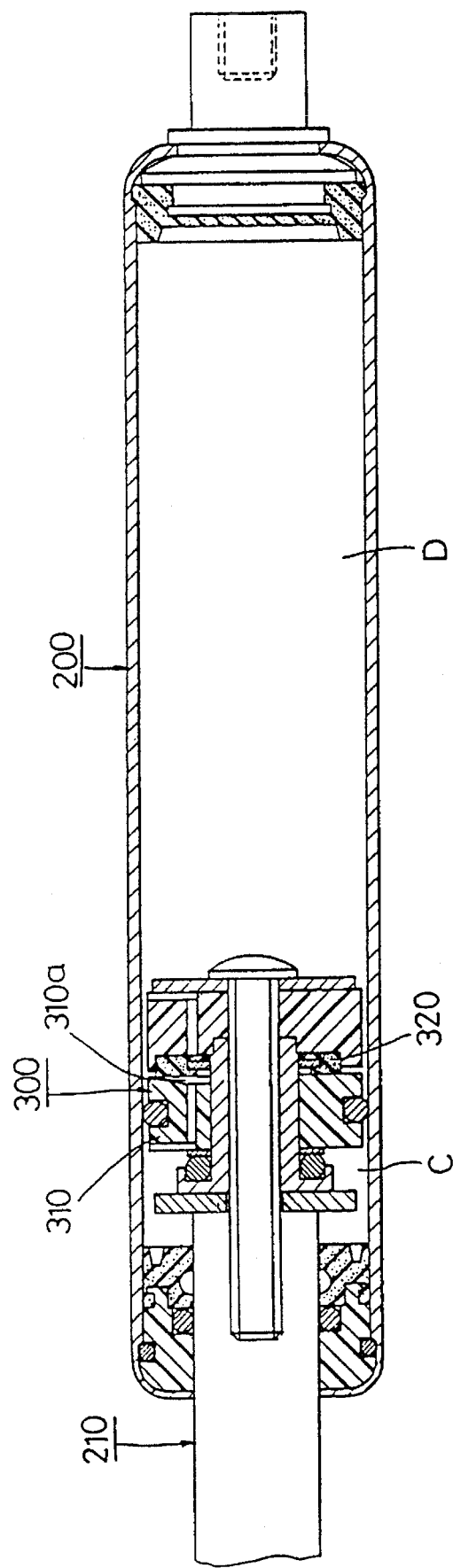
FIG. 16 is a revealed view showing a door closer according to a second preferred embodiment of the present invention.

FIG. 16 is a revealed view showing a door closer according to a second preferred embodiment of the present invention. The door closer includes a housing body, a cylinder, a piston rod; however, it contains only one speed-adjusting mechanism. The construction of the door closer according to the second preferred embodiment is very similar to the first preferred embodiment, and much of it will not be repeated. The main difference between the first and second preferred embodiments is that the cylinder 200 has a only one uniform of the same diameter. The piston rod 210 is provided with only one speed-adjusting mechanism 300, thereby, only a single-stage speed adjustment can be provided. This compares to the two-stage speed adjustment provided in the first preferred embodiment. The door closing mechanism is similar to the first preferred embodiment as described above. The fluids in the first and second chambers C and D are maintained at equal pressure, to thereby provide a steady door closing action. The speed adjustment is also achieved with a speed-adjusting screw (not shown, but is similar to that shown in FIG. 3) to adjust the relative position between the rotatable piston head 310 and the spirally shaped washer 320 to control the opening of tapered groove 310a provided in the rotatable piston head and thus the rate at which the compressed fluid flows through the tapered groove 310a. Door closers with more than two stages of speed adjustment can be provided based on the same principle disclosed in the present invention.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A door closer to be affixed to a door or door frame for closing said door after said door is opened, said door closer comprising:
   (a) a housing body and a cylinder inside said housing body, said cylinder having first and second cylinder ends, and first, second, and third sections, each of said sections of said cylinder having a different predetermined diameter, said cylinder being sealed at both ends thereof so as to contain a compressed fluid;
   (b) a piston rod penetrating through said first end of said cylinder and being in a sealed but movable relationship therewith, said piston rod being connected to a link via a connecting rod outside of said cylinder, said link being pivotably affixed to said housing body;
   (c) turning means sealingly provided at said second end of said cylinder for turning said cylinder;
   (d) first and second speed adjusting mechanisms sleeved on said piston rod, said first speed adjusting mechanism comprising a first rotatable piston head and a first fixed piston head, and said second speed adjusting mechanism comprising a second rotatable piston head and a second fixed piston head, said first rotatable piston head being constructed so as to be in a sealingly frictional contact with said first section of said cylinder via a first O-ring, and said second rotatable piston head being constructed so as to be in a sealingly frictional contact with said third section of said cylinder via a second O-ring;
   (e) said first rotatable piston head having first radially extending groove and first axial passage, both of which being in communication therebetween, and said first fixed piston head having a first spirally shaped recess for receiving a first spirally shaped washer, said first spirally shaped washer being disposed between said first rotatable piston head and said first fixed piston head, said first spirally shaped washer having a thickness greater than a depth of said first spirally shaped recess so as to provide a first spirally shaped protrusion covering at least a portion of said first radially extending groove;
   (f) said second rotatable piston head having second groove and second axial passage, both of which being in communication therebetween, and said second fixed piston head having a second spirally shaped recess for receiving a second spirally shaped washer, said second spirally shaped washer being disposed between said second rotatable piston head and said second fixed piston head, said second spirally shaped washer having a thickness greater than a depth of said second spirally shaped recess so as to provide a second spirally shaped protrusion covering at least a portion of said second radially extending groove; and
   (g) wherein said cylinder and said first and second speed adjusting mechanisms are so structured such that only said first rotatable piston head is in a sealingly frictional contact with said first section of said cylinder when said door is opened for no greater than a predetermined angle, and only said second rotatable piston head is in a sealingly frictional contact with said third section of said cylinder when said door is opened for greater than said predetermined angle;
   (h) whereby a turning of said turning meaning causing said cylinder to turn, which, in turn, causing either said first rotatable piston head or said second rotatable piston head to turn, thus changing portions of said first radially extending groove or said second radially extending groove covered by said first or second spirally shaped protrusion, so as to control flow rate of said compressed fluid through said first or second radially extending groove.

2. The door closer as claimed in claim 1 which contains a first chamber between said first rotatable piston head and said frond end of said cylinder and a second chamber between said first rotatable piston head and said rear end of said cylinder.

3. The door closer as claimed in claim 1 which contains a first chamber between said second rotatable piston head and said frond end of said cylinder and a second chamber between said second rotatable piston head and said rear end of said cylinder.

4. The door closer as claimed in claim 1 wherein each of said first and second fixed piston heads containing at least one axial through passage.

5. The door closer as claimed in claim 1 wherein said first radially extending groove is an inclined groove whose depth decreases with increased radius.

6. The door closer as claimed in claim 1 wherein said second radially extending groove is an inclined groove whose depth decreases with increased radius.

7. The door closer as claimed in claim 1 wherein said first spirally shaped washer containing a metal plate to prevent diffusion of fluid molecules therethrough.

8. The door closer as claimed in claim 1 wherein said second spirally shaped washer containing a metal plate to prevent diffusion of fluid molecules therethrough.

9. The door closer as claimed in claim 1 wherein said first spirally shaped washer being made of a resilient material.

10. The door closer as claimed in claim 1 wherein said second spirally shaped washer being made of a resilient material.

11. The door closer as claimed in claim 1 wherein said cylinder and said first and second speed adjusting mechanisms are so structured such that only said first rotatable piston head is in a sealingly frictional contact with said first section of said cylinder when said door is opened for no greater than about 10 degrees; and only said second rotatable piston head is in a sealingly frictional contact with said third section of said cylinder when said door is opened for greater than about 10 degrees.

12. The door closer as claimed in claim 1 wherein said turning means comprising a speed adjusting screw affixed to said cylinder.

13. The door closer as claimed in claim 1 which further comprising a rebound fixedly disposed on one side of said housing body such that it will be urged by said link when said door is fully opened, and said robound will push said link back when said door is released.

14. The door closer as claimed in claim 1 which further comprising a key-shaped stopper fixedly but pivotably disposed on one end of said housing body such that it can be urged by said connecting rod when said door closer is in an assembled position before installation, wherein a tail end of said key-shaped stopper will pivot downwardly when said door is opened for a first time so as to allow said connecting rod to move past its original position.

15. A door closer to be affixed to a door or door frame for closing said door after said door is opened, said door closer comprising:

(a) a housing body and a cylinder inside said housing body, said cylinder having a generally uniform diameter, said cylinder having first and second cylinder ends, and said cylinder being sealed at both ends thereof so as to contain a compressed fluid;

(b) a piston rod penetrating through said first end of said cylinder and being in a sealed but movable relationship therewith, said piston rod being connected to a link via a connecting rod outside of said cylinder, said link being pivotally affixed to said housing body;

(c) turning means sealingly provided at said second end of said cylinder for turning said cylinder;

(d) speed adjusting mechanisms sleeved on said piston rod, said speed adjusting mechanism comprising a rotatable piston head and a fixed piston head, said rotatable piston head being constructed so as to be in a sealingly frictional contact with said cylinder via an O-ring means;

(e) said rotatable piston head having a radially extending groove and an axial passage, both of which being in communication, and said fixed piston head having a spirally shaped recess for receiving a spirally shaped washer, said spirally shaped washer being disposed between said rotatable piston head and said fixed piston head, said spirally shaped washer having a thickness greater than a depth of said spirally shaped recess so as to provide a spirally shaped protrusion covering at least a portion of said radially extending groove;

(f) whereby a turning of said turning meaning causing said cylinder to turn, which, in turn, causing said rotatable piston head to turn, thus changing portions of said radially extending groove covered by said spirally shaped protrusion, so as to control flow rate of said compressed fluid through said radially extending groove.

16. The door closer as claimed in claim 15 wherein said turning means comprising a speed adjusting screw affixed to said cylinder.

17. The door closer as claimed in claim 15 which contains first chamber between said rotatable piston head and said front end of said cylinder and second chamber between said rotatable piston head and said rear end of said cylinder.

18. The door closer as claimed in claim 15 wherein said fixed piston heads containing at least an axial through passage.

19. The door closer as claimed in claim 15 wherein said radially extending groove is an inclined groove whose depth decreases with increased radius.

* * * * *